Aug. 29, 1950     L. J. ANDERSON ET AL     2,520,706
WINDSCREEN FOR MICROPHONES
Filed Jan. 30, 1948
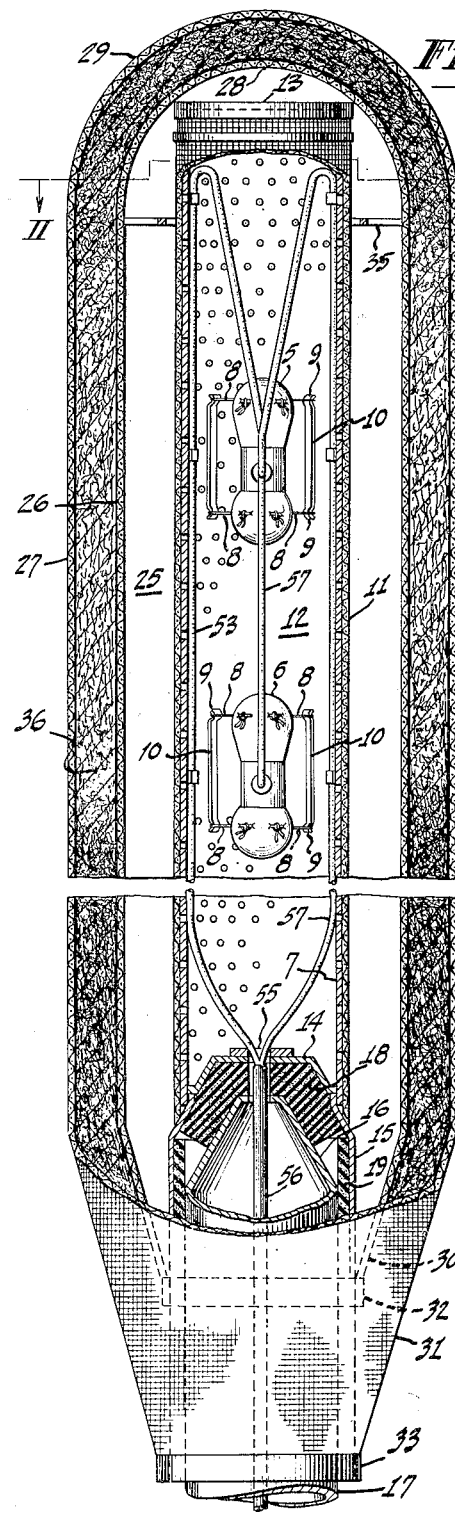
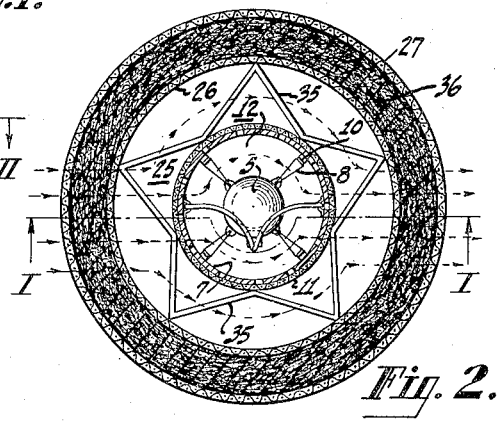
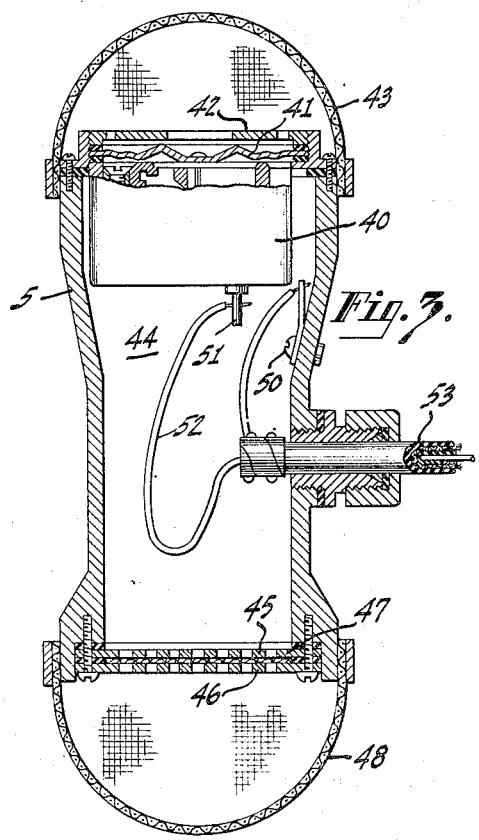
INVENTORS
LESLIE J. ANDERSON
& ALFRED H. KETTLER
BY
ATTORNEY Patented Aug. 29, 1950

2,520,706

UNITED STATES PATENT OFFICE 2,520,706

WINDSCREEN FOR MICROPHONES

Leslie J. Anderson, Moorestown, and Alfred H. Kettler, Collingswood, N. J., assignors to Radio Corporation of America, a corporation of Delaware Application January 30, 1948, Serial No. 5,436

8 Claims. (Cl. 181—33)

The present invention relates to a windscreen for sound transducers, such as microphones, which are required to be operated in locations exposed to adverse wind and weather conditions.

Sensitive sound pickup microphones and the like, are adversely affected by wind of any appreciable velocity which tends to raise the surrounding noise level, and may be harmed by adverse weather conditions, such as driving rain, when operated in exposed locations. Known protective means may further introduce noise at the microphone location when exposed to winds of appreciable velocity, and further may tend to attenuate desired sounds by reason of structural features provided for protective purposes.

It is therefore a primary object of this invention, to provide an improved windscreen or windscreen system for sound transducers, such as microphones and the like, which may operate effectively to reduce wind velocity from extremely high levels to a negligibly low level at the transducer without the generation of spurious sounds occasioned by wind flow, and without appreciably attenuating sound waves in a desired operating range for the transducer.

It is a further object of this invention, to provide an improved windscreen for sound transducers which provides protection against wind noises, without appreciable sound attenuation and which in itself does not generate spurious noises within the band of sound frequencies for which the transducer is operative.

It is also an object of the invention, to provide an improved windscreen for a microphone or other sound transducer, which effectively transmits sounds in a desired frequency spectrum without appreciable attenuation, and provides effective protection for the microphone against moisture caused by driving rain and other adverse weather conditions, whereby the microphone may be operated with normal efficiency in an exposed position out of doors for prolonged periods of time.

More specifically, the invention relates to an improved windscreen system for dual microphone installations for sound locating systems and the like, as used on shipboard or moving vehicles, and comprising a pair of microphones arranged in spaced relation on a common axis for unidirectional sound pickup. A sound locator system of the type referred to is shown, described and claimed in our copending application Serial No. 794,740, filed December 30, 1947, and now Patent 2,496,031 for Dual Microphone Sound Detector System.

In the system referred to, a pair of directional microphones are mounted one above the other, or in a front-to-rear relation on a common axis, for sound pickup in the same upward or frontal direction, and connected into an electrical system for imparting thereto additional directional characteristics, for the location of sound sources such as planes above or approaching ships or vehicles.

In a sound pickup system of the character referred to, furthermore, the microphone or microphones must be weather resistant to rain and wind and must be particularly efficient and sensitive within the sound spectrum of the desired incoming sound signals to be picked up, and inefficient for other sounds such as local noises.

It is therefore a further object of this invention, to provide an improved windscreen and microphone arrangement whereby one or more sensitive microphones may be mounted on a mast or other suitable supporting element, in a position exposed to high wind velocities and adverse weather conditions, such as driving rain, without being adversely affected thereby, and at all times being fully responsive to sounds in a predetermined desired frequency range and direction.

In accordance with the invention, a compound windscreen for microphones and like sound transducers is provided which is highly and effectively resistant to wind velocity, which generates no appreciable wind noises of itself within the frequency band of sounds to be picked up, and which effectively prevents moisture and rain from penetrating to the interior and the microphone element or elements.

The invention will, however, be further understood from the following description, when considered in connection with the accompanying drawing, and its scope will be pointed out in the appended claims.

In the drawing:

Figure 1 is a view in elevation, and partly in cross-section, showing an improved microphone windscreen embodying the invention, Figure 2 is a sectional plan view of the windscreen of Figure 1 taken on the section line II—II of Figure 1, and Figure 3 is a sectional view, in elevation and on an enlarged scale, of a microphone unit shown in Figure 1.

Referring to the drawing, in which like reference numerals throughout the various figures refer to like elements and parts, and referring particularly to Figures 1 and 2 thereof, one or more microphone units, such as a pair of microphone units 5 and 6, are suspended along the axis and centrally of an elongated, perforated metal cylinder 7, by means of flexible bands or cords 8 attached to the microphone units and looped over the hooked ends 9 of bracket elements 10, attached to the inner walls of the cylinder in circumferentially spaced relation to each other at each desired microphone location along the length of the cylinder.

The outside of the cylinder is covered by a fine mesh wire screen 11 which may, for example, be formed of 80-mesh wire screen, which provides an effective inner windscreen surrounding the inner cylindrical chamber or space 12 formed by the perforated metal cylinder about the microphone unit or units.

The ends of the metal cylinder 7 are closed; the upper end being closed by a suitable cap 13, and the lower end being closed by the upper frustro-conical end 14 of a cylindrical tubular metal socket or frame 15 extending from the lower end of the metal cylinder in axial extension thereof, as shown more fully in Figure 1.

The socket element 15 and the inner metal cylinder 7 connected therewith, provide, in effect, a rigid support and framework for the microphone suspension therein, and by reason of the socket construction is adapted to be seated on the conical end 16 of a suitable cylindrical pipe or mast 17 by which the windscreen and microphone assembly is spaced from other structure (not shown) with which it is used, such as the mast of a ship, for example.

Between the conical end 16 of the supporting mast or pipe 17 and the socket base for the inner perforated metal cylinder or frame 7, there is provided a frustro-conical body 18 of resilient material, such as rubber, for example, and a body or sleeve 19 of similar resilient material between the main cylindrical body of the socket element 15 and the upper end of the pipe or mast 17.

On shipboard, the pipe or mast 17 may be of heavy steel tubing approximately six inches in diameter projecting twelve to fourteen feet above the top of the main mast to support the windscreen and microphone structure shown, whereby it is elevated above other elements which in response to high wind, may generate undesired noises in the vicinity of the microphones.

The compound windscreen for the microphone units, in accordance with the invention, further includes an outer windscreen and weather resistant casing, concentric with and spaced from the inner cylindrical screen 11, to provide an intermediate annular open space or chamber 25.

The outer windscreen comprises two spaced concentric screen cylinders 26 and 27 having upper dome-shaped or hemispherical ends 28 and 29, respectively, of the same screen material, and having cone-shaped lower ends 30 and 31, respectively, terminating in suitable rings 32 and 33, respectively, secured to the cylindrical sleeve or socket 15 as indicated in Figure 1, whereby the outer windscreen assembly or casing is supported by the mast 17, and is rigidly connected with the frame structure comprising the perforated cylinder 7 and the socket extension thereof 15, as one rigid assembly.

The upper end of the inner screen 11 is steadied and held in concentric spaced relation to the outer screen by a suitable wire grid 35 of star-shaped configuration secured to the inner cylinder and contacting the outer wall of the space 25 as shown in Figures 1 and 2.

It will be noted that the dual windscreen provided by the screen cylinders 26 and 27, is further provided with additional filtering means comprising a body or filler of fibrous material packed into the space between the inner and outer screen layers 26 and 27 and comprising any suitable wind and weather resistant material such as horsehair or other curled, fibrous material. Any other suitable fibrous material, such as fine fiber glass, which is wind and weather resistant and which furthermore may transmit sounds within a desired frequency spectrum wtihout appreciable attenuation, whether wet or dry, may be used. In actual operation, curled horsehair has been found to be highly efficient for the transmission of sound without appreciable attenuation, and highly resistant to wind and rain as a filter material.

The windscreening obtained is the result of a non-linear relation between the viscosity losses in the screen and filter material, and the air particle velocity. The higher the velocities the greater is the viscosity coefficient. Since the particle velocity for wind is many times that encountered in a sound wave, the attenuation of the wind velocity is very large, whereas the attenuation of the sound wave is substantially negligible.

The annular space 25 between the outer screen assembly 26—36—27 and the inner screen 11, and the inner cylindrical chamber or open space 12 surrounding the microphone, together with the screen elements, serve to produce the effect of a two-stage filter between the exterior of the windscreen structure and the microphone units.

A preferred form of microphone for use within the compound windscreen is one, as shown in the drawing, of cylindrical shape with domed or rounded ends and adapted for directional operation.

Referring to Figure 3 along with Figures 1 and 2, one of the microphone units 5 is shown in detail, by way of example. Each unit includes an electro-acoustical transducer 40 having a sound responsive diaphragm 41 mounted in the upper end of the unit and provided with a perforated cover plate 42, outside of which is placed a suitable fine-mesh windscreen 43, of dome or hemispherical shape as shown.

The opposite side of the diaphragm is also open to the interior of the unit, and is coupled through the enclosed space or chamber 44 within the unit to an acoustic phase-shifting network at the bottom of the casing, through which it communicates with the cylindrical chamber 12 in the windscreen.

The phase shifting network consists of two spaced parallel flat plates or discs 45 and 46 having a plurality of holes whch may be brought into and out of registration by rotation of one of the discs with respect to the other, and a number of layers of cloth or other acoustic resistance material between the discs, as indicated at 47.

Uniformity of resistance is obtained by rotating the successive layers of cloth relative to each preceding layer by a small amount thereby to change the position of the thread warp throughout the various layers. The overall resistance is determined by adjusting the number of layers of cloth, and the resistance and inertance of the filter are adjusted by rotating one plate relative to the other, thus exposing varying percentages of the holes as above described. The optimum adjustment is considered to be obtained when the phase shift for sounds arriving from below is such that the acoustic pickup is a minimum.

With this arrangement sound waves received through the acoustic filter 45—46—47 and the acoustic capacitance or chamber 44, are delayed in phase sufficiently to react upon the diaphragm 41 of the transducer in opposed phase relation to sound waves from the same source as they arrive from above or frontally of the diaphragm 41, thereby substantially canceling their effect on the diaphragm.

For the reception of sound waves from above or frontally, the diaphragm 41 responds directly since the back wave is further delayed in passing through the filter and acoustic capacitance above mentioned, whereby it appears in aiding phase relation. The lower end of the unit is likewise provided with a windscreen of dome or hemispherical shape as shown at 48. This may be of the fine-mesh wire type like that of the screen 43. An 80-mesh wire screen has been found to be suitable for this purpose and serves to reduce any slight wind velocity which may be present within the chamber 12 to substantially zero value at the microphone diaphragm 41, thereby completely eliminating interference from wind noises.

The overall diameter or size of the windscreen depends generally upon the frequency range of the desired sound pickup for the microphone system, which, in the present example, may be considered to be a frequency range between 130 and 330 cycles per second. For this range of operation, the first or inner cylindrical windscreen 11 may have a diameter of approximately six inches, and with the fine mesh construction, has been found to reduce the wind velocity to approximately ⅛ of the wind velocity outside the screen. The wire screen has the advantage that it is effective as a sound screen under all weather conditions, and is not subject to change in the presence of moisture.

The outer screen, comprising the concentric cylinders 26 and 27, is preferably of a larger mesh, such as 10-mesh wire, and may be of diameters of the order of eleven and fifteen inches, respectively, for the frequency range under consideration. The annular space 25 between the outer screen and the inner screen is left open to provide an acoustical capacitance or chamber as part of the dual filter system, and further to provide a shunt path for free air flow around the inner screen 11, so that high velocity wind or air flow may stream around the screen 11 and pass through the outer screen at the diametrically opposite side somewhat after the manner indicated by the dotted arrows in Figure 2.

Likewise, extremely high velocity air currents which are forced through the outer screen and which may penetrate the inner screen, meet the same shunt path arrangement within the acoustical chamber 12 and may flow in a shunt path around the microphone units, also as indicated by the additional dotted arrows in Figure 2. It has been found that this principle of dual shunt paths or circuits around the successive cylindrical elements of the concentric arrangement shown, is effective in the presence of high wind velocities, for preventing noise pickup from the passage of wind through and about the screen and the microphone elements per se as will hereinafter be more fully described.

The large mesh outer screens, and the body of coarse, curled fibrous material, forming part of the outer screen assembly and located between the closed cylinders 26 and 27, provide for the ready transmission of sounds under all weather conditions as neither the fibrous material nor the open mesh screens tend to hold water and become clogged in the presence of rain. Furthermore, this screen structure is effective to prevent any appreciable penetration of water into the annular chamber or space 25.

Noise frequencies generated by the wind are approximately proportional to the wind velocity and inversely proportional to the diameter of the obstacle. The noise generated by the individual wires and the curled fibrous material in the windscreen is high in frequency due to their small diameter and therefore fall well above the frequency response range of the microphone units.

Due to the large size of the complete windscreen and the tubular support, the frequencies generated are below the desired operating range of the microphone units at even the highest wind velocity, as will hereinafter be considered. Noise due to rain on the windscreen is relatively low and does not affect the operating sensitivity of the microphone system.

Each microphone connection is brought out through a shielded conductor, the shield being connected to the frame and grounded as indicated at 50 in Figure 3, and the live microphone terminal 51 being connected to the central conductor 52, as shown for the output cable 53 of the microphone unit 5. The cable 53 may be looped upwardly in the chamber 12 and attached to the side walls of the perforated cylinder 7 as shown, and passes downwardly and through a central opening 55 in the socket closure means 14, the tip 16 of the supporting mast 17 and the resilient damping material 18 as shown in Figure 1. At that point, the cable 53 is formed into a central output cable 56 with the output cable 57 from the microphone unit 6, to pass therewith downwardly through the center of the supporting mast 17. The connection 57 is likewise a shielded conductor having a similar connection with the microphone unit 6 as described in connection with Figure 3 for the microphone unit 5, and may similarly be attached to the inner side walls of the perforated cylindrical support 7, as shown in Figures 1 and 2.

From the foregoing description it will be seen that a windscreen embodying the invention comprises a plurality of spaced concentric cylindrical screens or screen elements closed at the ends and containing one or more sound transducer units of cylindrical form located at or along the axis of the screen. The cylindrical shape of the screen structure, with hemispherical closed ends, offers low obstruction to wind flow around the structure.

The windscreen structure, generally, has the following elements for consideration:

(a) An outer cylindrical assembly comprising spaced concentric cylindrical screens of coarse mesh with an interposed layer of fibrous material therebetween, introducing resistance or viscosity to air flow, which increases with air velocity, and providing rain and weather protection without clogging or sound attenuation.

(b) An annular open space between the outer cylindrical screen assembly and the inner cylindrical screen assembly, providing an acoustical capacitance and a shunt air flow path around the inner screen assembly for relatively high velocity air currents.

(c) An inner fine screen layer or cylindrical screen assembly, concentric with the first or outer screen assembly, and radially spaced there-from as aforesaid, providing additional resistance or viscosity to air flow and having a finer mesh than the outer screen assembly.

(d) A second open space of annular form about the microphone units for shunt air flow, and at the same time providing a second acoustical chamber or capacitance in the dual filter system.

(e) A microphone or microphone assembly placed within the second open space centrally thereof at the axis of the concentric screen system and positioned for the reception of desired sound waves in a predetermined direction while being substantially non-responsive to sounds from the opposite direction.

Practical tests made in a high velocity wind of fifty miles per hour, for example, have been shown negligible wind velocities within the windscreen system described.

With respect to the non-generation of spurious noises within the band of frequencies of interest it is necessary to select the frequency band of operation in which the system is to be used, which in this case has been indicated as from 130 to 330 cycles per second. A well known formula giving the frequency of "Aeolian Tones" is used to determine the upper and lower limits of the relation between the maximum velocity of the wind to be encountered and the diameter of the obstacle, which is the outside diameter of the windscreen, this formula being as follows:

$$\text{frequency} = f = .185 \times \frac{\text{velocity of wind}}{\text{diameter of obstacle}}$$

This is used for both the upper and the lower limits of the frequency band. For computation purposes, wind velocities below approximately four miles per hour need not be considered as it has been found that no appreciable wind noises are generated below this velocity which would materially affect even the most sensitive microphone system.

A wind velocity which may be considered a reasonable maximum is selected for computation purposes, as approximately sixty miles per hour, for computing the diameter of the windscreen. From the preceding consideration, there results a minimum large dimension and maximum small dimension, which will satisfy the equation. It has been found that the screen wires should be .015 inch or smaller in diameter, while the body dimensions of the windscreen including the supporting structure should be six inches in diameter, or larger, for the frequency range under consideration and with the wind velocities contemplated.

For the dimensions as determined above, there are no noise frequencies within the frequency band for the chosen operating conditions, as has been proved by tests conducted with wind velocities over fifty miles per hour as above.

The windscreen is substantially impenetrable to rain and moisture for the reason that the layer of porous or fibrous material while having considerable thickness to introduce high viscosity losses at high wind velocities, is sufficiently open not to be clogged by water. Rain water and moisture tend to trickle downwardly in the porous material and so flow from the windscreen outwardly at the bottom and normally fail to reach the interior of the screen.

In the event that high wind drives some water particles through the outer cylindrical screen assembly, the annular open space 25 normally prevents them from reaching the inner screen. However, in the event some further particles reach the next screen they lodge thereon and trickle downwardly and pass outwardly of the screen along with the moisture which gathers in the annular space between the screen assemblies.

Moisture or rain particles which fail to follow the shunt path around the inner screen assembly and penetrate the inner screen assembly may fall freely in the open space 12 within the inner screen and are prevented from striking the microphone units.

Heretofore the amount of research work that has been done in the general field of providing windscreens for microphones and other sound transducers for reducing the effects of wind and weather on such transducers has been relatively small, principally because the various problems encountered in adapting and perfecting the performance of such transducers for indoor work have been more urgent.

The compound windscreen system for sound transducers of the present invention has been found to meet the problem effectively, with a relatively simple, rugged and easily manufactured arrangement, of relatively low constructional cost. The multi-stage wind filter or compound windscreen arrangement may be applied to single or multiple microphone installations for a variety of other uses, including open-air pickup of speech, public affairs and the like, where noise and adverse weather conditions may present a problem for clear sound pickup. Another use for the device is in the rapid panning of motion picture sets, as well as in the taking of outdoor scenes where weather and noise are often problems.

We claim as our invention:

1. A windscreen system for sound transducers and the like, comprising in combination, an inner cylindrical screen providing an enclosure for a sound transducer, and an outer cylindrical screen assembly substantially concentric with and spaced from said first named screen, whereby a shunt air flow path is provided around the inner screen, said screen assembly comprising two spaced substantially concentric screen cylinders of relatively larger mesh than the first named screen, and a filler of fibrous sound conducting material between said last named screen cylinders.

2. A compound microphone windscreen structure comprising a plurality of spaced concentric cylindrical screens, a cylindrical microphone casing located along the axis of the inner screen, the space between the inner screen and said microphone casing and between the inner screen and the next adjacent outer screen provide annular shunt air flow paths through said windscreen, a body of fibrous filler material located between the outer screen and the next adjacent outer screen providing a sound conducting wind and moisture filter, a dome-shaped closure for one end of said screen structure, tubular means at the opposite end thereof for supporting said screens in substantially fixed relation to each other, said microphone casing having open ends, a wind screen element for each end of said casing, and a sound filter adjacent one end of and within said casing, comprising a pair of spaced, perforated discs and a plurality of layers of fabric therebetween in predetermined relation to each other.

3. A microphone windscreen structure comprising a pair of spaced substantially concentric cylindrical screens having hemispherical ends providing low resistance to wind flow around said windscreen, said windscreen having an outer diameter such that the normal response thereof to wind currents is below a predetermined useful sound frequency range and said screens having a wire mesh size such that the natural frequency response thereof to wind currents of predetermined high value is above said useful sound frequency range, a body of fibrous material providing a packing between said screens, an inner cylindrical screen having closed ends and being substantially concentric with and spaced from the inner one of said first named pair of screens to provide an annular air flow space therebetween as a shunt path for air flow about said inner screen, and a cylindrical supporting structure for said inner screen having a connection with the first named pair of screens for jointly supporting said screens therewith.

4. A microphone windscreen structure comprising a pair of spaced substantially concentric cylindrical screens, said windscreen having an outer diameter such that the normal frequency response thereof to wind currents is below a predetermined useful sound frequency range, a body of fibrous material providing a packing between said screens, an inner cylindrical screen having closed ends and being substantially concentric with and spaced from the inner one of said first named pair of screens to provide an annular air flow space therebetween as a shunt path for air flow about said inner screen, a cylindrical supporting structure for said inner screen having a connection with the first named pair of screens for jointly supporting said screens therewith, and a cylindrical microphone casing resiliently mounted within the inner screen substantially coaxially therewith and in spaced relation thereto, thereby to provide a second annular air flow space as a shunt path for air flow about said microphone casing.

5. A microphone windscreen structure comprising a pair of spaced substantially concentric cylindrical screens, said windscreen having an outer diameter such that the normal frequency response thereof to wind currents is below a predetermined useful sound frequency range, a body of fibrous material providing a packing between said screens, an inner cylindrical screen having closed ends and being substantially concentric with and spaced from the inner one of said first named pair of screens to provide an annular air flow space therebetween as a shunt path for air flow about said inner screen, a cylindrical supporting structure for said inner screen having a connection with the first named pair of screens for jointly supporting said screens therewith, a cylindrical microphone casing resiliently mounted within the inner screen substantially coaxially therewith and in spaced relation thereto, thereby to provide a second annular air flow space as a shunt path for air flow about said microphone casing, said supporting structure comprising a rigid perforated cylinder lining said inner screen and having a cylindrical socket extension member connected therewith, and a tubular mast having one end resiliently connected with said socket extension member to support said windscreen structure.

6. A windscreen system for a cylindrical microphone having open ends for the reception of sound waves comprising an inner cylindrical fine mesh screen surrounding said microphone substantially concentric therewith and having closed ends, a supporting structure for said screen and microphone including a resilient mounting for said microphone, a second cylindrical screen of coarser mesh concentric with and spaced from said first named screen externally thereof providing a shunt air flow path around the inner screen, an outer cylindrical screen spaced from and concentric with the second named screen, said outer screen being of a coarser mesh than said inner screen, and a body of fibrous sound conducting material enclosed within the space between the second and outer cylindrical screens.

7. A windscreen for a cylindrical microphone having open ends for the reception of sound waves comprising an inner cylindrical fine mesh screen surrounding said microphone substantially concentric therewith and having closed ends, a supporting structure for said screen and microphone including a resilient mounting for said microphone, a second cylindrical screen of coarser mesh concentric with and spaced from said first named screen externally thereof to provide an annular chamber as an acoustical filter element in conjunction with the impedance of said screens for preventing the flow of wind of appreciable velocity to the microphone and providing a shunt air flow path around the inner screen, an outer cylindrical screen spaced from and concentric with the second named screen, said outer screen being of a coarser mesh than said inner screen, and a body of fibrous filler material enclosed within the space between the second and outer cylindrical screens to provide a high viscosity outer filter element for rain and wind flow.

8. A windscreen for a cylindrical microphone having open ends for the reception of sound waves comprising an inner cylindrical fine mesh screen surrounding said microphone substantially concentric therewith and having closed ends, a supporting structure for said screen and microphone including a resilient mounting for said microphone, a second cylindrical screen of coarser mesh concentric with and spaced from said first named screen externally thereof providing a shunt air flow path around the inner screen, an outer cylindrical screen spaced from and concentric with the second named screen, said outer screen being of a coarser mesh than said inner screen, and a body of fibrous filler material enclosed within the space between the second and outer cylindrical screens, said second and outer screens being concentrically curved and dome shaped at one end and being conically shaped at the opposite end to meet said supporting structure, thereby to present a smooth contour to air flow about said structure.

LESLIE J. ANDERSON.
ALFRED H. KETTLER.

REFERENCES CITED

The following references are of record in the file of this patent:

UNITED STATES PATENTS

| Number | Name | Date |
| --- | --- | --- |
| 1,589,408 | Maxfield | June 22, 1926 |
| 2,050,581 | Orem | Aug. 11, 1936 |
| 2,301,638 | Olson | Nov. 10, 1942 |

OTHER REFERENCES

"Recording Sound for Motion Pictures," McGraw-Hill Book Co., Inc., New York, 1931, pages 124, 125.